United States Patent
Schnaibel et al.

[11] Patent Number: 6,131,446
[45] Date of Patent: Oct. 17, 2000

[54] METHOD AND ARRANGEMENT FOR DIAGNOSING AN EXHAUST-GAS PROBE

[75] Inventors: Eberhard Schnaibel, Hemmingen; Lothar Raff, Remseck; Claus-Peter Pflieger, Vaihingen, all of Germany

[73] Assignee: Robert Bosch GmbH, Stuttgart, Germany

[21] Appl. No.: 09/084,789

[22] Filed: May 27, 1998

[30] Foreign Application Priority Data

May 28, 1997 [DE] Germany .............................. 197 22 334

[51] Int. Cl.$^7$ .................................................. G01M 19/00
[52] U.S. Cl. ........................ 73/118.1; 60/276; 73/23.32; 701/34; 701/109
[58] Field of Search .............................. 73/23.31, 23.32, 73/118.1, 116, 117.3, 117.2; 701/101, 103, 109, 34; 60/276, 277

[56] References Cited

U.S. PATENT DOCUMENTS

| | | | |
|---|---|---|---|
| 4,169,440 | 10/1979 | Taplin et al. ............................. | 60/276 |
| 4,494,374 | 1/1985 | Kitahara et al. .......................... | 60/276 |
| 5,065,728 | 11/1991 | Nakaniwa ................................ | 123/489 |
| 5,235,957 | 8/1993 | Furuya .................................... | 123/688 |
| 5,267,439 | 12/1993 | Raff et al. ................................ | 60/276 |
| 5,363,091 | 11/1994 | Kotwicki et al. ......................... | 60/277 |
| 5,488,858 | 2/1996 | Achleitner ............................... | 73/118.1 |
| 5,869,743 | 2/1999 | Jones et al. .............................. | 73/23.31 |

FOREIGN PATENT DOCUMENTS

| | | |
|---|---|---|
| 0796988 | 9/1997 | European Pat. Off. . |
| 09004496 | 1/1997 | Japan . |

OTHER PUBLICATIONS

"Injection, fonctionnement affiné et maintenance facilitée" Revue Technique Automobile, 50(1995)Fevrier, No. 570, Boulogne–Billancourt, France.

*Primary Examiner*—George Dombroske
*Attorney, Agent, or Firm*—Walter Ottesen

[57] ABSTRACT

The invention is directed to a method for diagnosing an exhaust-gas probe mounted in the exhaust-gas system of an internal combustion engine for conducting the exhaust gas of the engine. The exhaust-gas probe is mounted downstream of the catalytic converter. The output signal of the exhaust-gas probe is monitored as the output signal changes in response to changes of the concentration of at least one of the components of the exhaust gas. The rate of the change is applied as a criterion as to the state of deterioration of the exhaust-gas probe.

8 Claims, 1 Drawing Sheet

METHOD AND ARRANGEMENT FOR DIAGNOSING AN EXHAUST-GAS PROBE

FIELD OF THE INVENTION

The invention relates to the diagnosis of an exhaust-gas probe mounted rearward of a catalytic converter in the exhaust-gas system of an internal combustion engine.

BACKGROUND OF THE INVENTION

Exhaust-gas probes, which are arranged rearward of a catalytic converter, serve essentially two purposes: they are applied to supplement the lambda control which is essentially based on the signal of an exhaust-gas probe arranged forward of the catalytic converter. In addition, the exhaust-gas probes make possible a monitoring of the conversion capability of the catalytic converter. Both functions are described in German patent publication 3,500,594 which corresponds to U.S. patent application Ser. No. 06/877,882, filed Jan. 10, 1986, abandoned.

It has been shown that the results of monitoring the catalytic converter is influenced by the state of deterioration of the exhaust-gas probe rearward of the catalytic converter.

SUMMARY OF THE INVENTION

In view of the above, it is an object of the invention to provide a diagnostic method for the rear exhaust-gas probe with which a deteriorated exhaust-gas probe can be reliably detected.

The method of the invention is for diagnosing an exhaust-gas probe mounted in the exhaust-gas system of an internal combustion engine for conducting the exhaust gas of the engine. The exhaust-gas probe is mounted downstream of the catalytic converter. The method includes the steps of: monitoring the output signal of the exhaust-gas probe as the output signal changes in response to changes of the concentration of at least one of the components of the exhaust gas; and, applying the rate of the change as a criterion as to the state of deterioration of the exhaust-gas probe.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
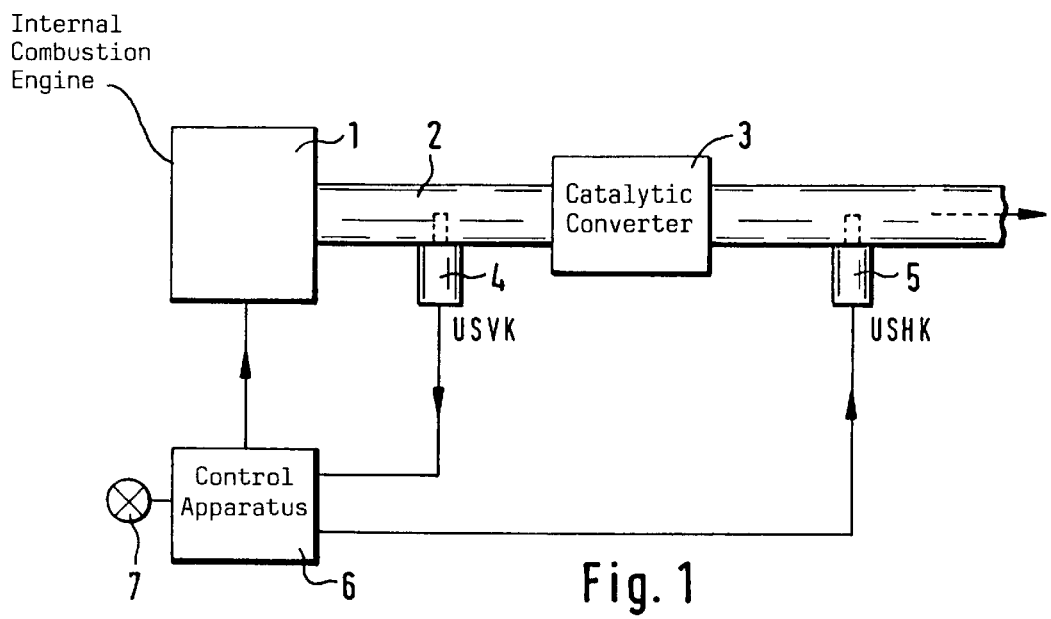
FIG. 1 is a schematic block diagram showing the technical context of the invention; and, FIG. 2 shows the signal traces of exhaust-gas probes mounted rearward of the catalytic converter with the traces being for exhaust-gas probes having greatly different degrees of the deterioration.

Reference numeral 1 in FIG. 1 identifies the internal combustion engine and reference numeral 2 identifies the exhaust-gas system of the engine. The exhaust gas system includes a catalytic converter 3 and an exhaust-gas probe 4 mounted forward of the catalytic converter and an exhaust-gas probe 5 mounted rearward of the catalytic converter. The signals of the two probes are supplied to the control apparatus 6. The control apparatus 6 forms signals for controlling, for example, the mixture formation and the ignition of the engine from these signals and from other signals corresponding to additional operating parameters of the engine, such as load and rpm. A fault lamp 7 represents a means for indicating and/or storing exhaust-gas relevant fault functions of the engine or one of its exhaust-gas components (probe means and catalytic converter).

The probe 4 mounted forward of the catalytic converter rapidly supplies data as to the composition of the air/fuel mixture. The signal of probe 4 is therefore usually used for control purposes and compared to a desired value. The rearward probe 5 reacts with greater inertia to changes in the mixture because of the greater distance to the engine and because of the catalytic converter lying therebetween. However, the probe 5 supplies more precise data. Accordingly, the signal of probe 5 is used, inter alia, to adjust the mixture control, for example, by influencing the desired value for the signal of the forward probe. Because of this adjusting function, a probe signal level of the probe, which is mounted rearward of the catalytic converter, adjusts to approximately 600 mv during controlled operation. This corresponds to an exhaust gas which is slightly oxygen deficient relative to stoichiometric relationships. This is shown in the left half of FIG. 2. After the transition into overrun operation with the metering of fuel cut off to the engine, the oxygen component in the exhaust gas perforce increases. The probe rearward of the catalytic converter also reacts to the increase of the oxygen content with a drop of the probe signal level with a certain delay TV which is caused by the oxygen storage capacity of the catalytic converter. This is shown in the right half of FIG. 2 for three different probes. The step in line 2.4 marks the start of overrun operation with fuel cutoff. From this time point on, oxygen excess is present in the exhaust gas forward of the catalytic converter. This oxygen excess can, at first, still be taken up by the catalytic converter so that the oxygen excess in the time span TV is not yet present in the signal of the rearward probe. The length of this time span is dependent upon the catalytic converter and is therefore the same for the three different rearward probes. The subsequent reactions of the rearward probes to the increase of the oxygen content develop individually for each probe. The very steep drop of the line 2.1 characterizes a probe which is in the new state; whereas, the flatter signal traces of signals 2.2 and 2.3 are typical for probes which are already deteriorated.

This different signal performance can lead to incorrect conclusions in the monitoring of the conversion capability of catalytic converters. The monitoring of the conversion capability is based on the capability of an adequately active catalytic converter to take up oxygen and to release oxygen. The oxygen content in the exhaust gas forward of the catalytic converter (which executes a periodic oscillation caused by the control) is averaged by the catalytic converter to a certain extent. Stated otherwise, and with reference to the oxygen content in the exhaust gas, an operable catalytic converter exhibits a lowpass characteristic. The control oscillation in the oxygen content is shown only in a greatly attenuated form rearward of the operable catalytic converter. For a known conversion monitoring, a quotient of the signal amplitudes of the exhaust-gas probe forward and rearward of the catalytic converter is applied as a measure for the attenuation of the oscillation of the oxygen content in the exhaust gas.

If this quotient exceeds a pregiven threshold, this shows a defective oxygen storage capability of the catalytic converter which is associated with a defective conversion capability. It has been shown that some catalytic converters have been erroneously evaluated as being operable even though they no longer satisfy statutory requirements.

The above can be explained with the illustrated performance of the deteriorated exhaust gas probe arranged rearward of the catalytic converter. The inertia of the deteriorated probes delays the change in the signal level. Such delays are caused also by the oxygen storage capability of the catalytic converter. These delays are that much greater the greater the storage capability is. The increase of the inertia of the probe signal, which is associated with deterioration, therefore becomes manifest with respect to measurement as though the oxygen storage capability of the catalytic converter is greater than it actually is. For this reason, it can happen that poor catalytic converters can still be evaluated as being good when they are checked with deteriorated probes.

Figure 2:
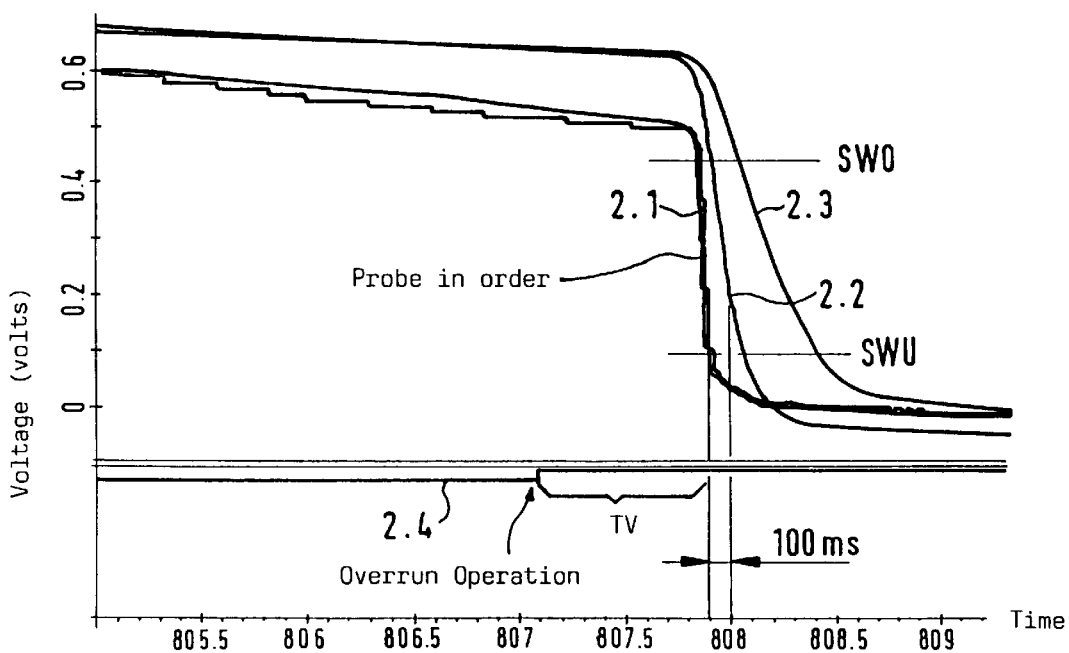

According to the invention, the different slopes or rates of change of the probe signals are used for the diagnosis of the exhaust-gas probe. A first embodiment of the invention provides for the evaluation of the flank decay time in the signal of the rearward probe between an upper voltage threshold (SWO) and a lower voltage threshold (SWU) during overrun operation. As can be seen in FIG. 2, this time (which is inversely proportional to slope or rate of change) is for the new probe (signal 2.1) comparatively small and is comparatively large for the deteriorated probes (signals 2.2, 2.3). Accordingly, an exhaust-gas probe is evaluated as defective in accordance with this embodiment when the measured flank fall-off time (for example, 100 ms) exceeds a predetermined threshold value. This method therefore corresponds, to a certain extent, to the evaluation of a difference quotient formed as (SWO−SWU)/(flank fall-off time).

The reliability of this method is advantageously increased by a repeated detection and averaging of the slope. The slope mean value or the average flank fall off time is used as an evaluation criterion.

A second embodiment provides the formation of a larger quantity of different difference quotients in combination with a subsequent statistical evaluation. The larger quantity results, for example, in that the differences of two sequential probe signal values are formed in the time raster of the probe signal scans and are divided by the time spacing of their detection. The scanning period is usually in the order of magnitude of milliseconds. From the quantity so formed, a characteristic quantity is subsequently determined, for example, the maximum, the mean value or the median of the probe signal slopes and is applied to a threshold value comparison as a distinguishing criterion. Here, the threshold value is to be so dimensioned that the slope values of probes which are still good lie above the threshold value. The quantity of the difference quotients is advantageously formed in the region of the probe signal level change, that is, between an upper and a lower limit value. Alternatively to the evaluation of the probe signal level drop at the start of overrun phase of operation with fuel shutoff, the probe signal level increase when resuming metering of fuel can be evaluated. It is here essential too that a trace of the probe signal level change, which is too flat, can be used as a fault criterion.

The occurrence of a fault can, for example, be signaled by switching on the fault lamp 7.

The advantages of the first embodiment lie in the simpler software realization. As an advantage of the second embodiment, a better separation results, that is, the probes which are still good and those which are already too poor are differentiated in the second method with greater reliability.

It is understood that the foregoing description is that of the preferred embodiments of the invention and that various changes and modifications may be made thereto without departing from the spirit and scope of the invention as defined in the appended claims.

What is claimed is:

1. A method for diagnosing an exhaust-gas probe mounted in the exhaust-gas system of an internal combustion engine for conducting the exhaust gas of said engine, the exhaust-gas system including a catalytic converter and the exhaust gas containing components including oxygen, the exhaust-gas probe having a Nernst characteristic and being sensitive to said oxygen and supplying an output signal, the engine having an overrun phase during the operation thereof, the method comprising the steps of:

mounting said exhaust-gas probe downstream of said catalytic converter;

monitoring the output signal of said exhaust-gas probe as said output signal changes in response to changes of the concentration of at least one of the components of said exhaust gas;

evaluating the rate of change of said output signal of said exhaust-gas probe to changes in the oxygen content of said exhaust gas after cutoff of the fuel metering to said engine in said overrun phase of operation; and, applying the rate of said change as a criterion as to the state of deterioration of said exhaust-gas probe.

2. The method of claim 1, wherein the output signal defines a slope where the level of said output signal changes for said exhaust-gas probe when said engine is in said overrun phase of operation; and, said slope is evaluated.

3. The method of claim 2, wherein said slope is detected between upper and lower limit values.

4. The method of claim 3, wherein said slope passes through said limit values within a predetermined time span; and, said slope is defined as the quotient of the difference of said limit values and said time span.

5. The method of claim 4, wherein mean values of repeatedly detected slopes or flank fall-off times are applied as said criterion.

6. The method of claim 3, comprising the further steps of:

repeatedly scanning said output signal in the time which lies between the passthrough of said upper and lower limit values to obtain respective signal differences;

repeatedly forming the quotient of said differences referred to the scanning time span; and, making a static evaluation of the plurality of difference quotients to obtain a slope value as said criterion.

7. The method of claim 6, wherein the minimum, the maximum, the mean value or the median of said difference quotients is applied as said criterion.

8. An arrangement for diagnosing an exhaust-gas probe mounted in the exhaust-gas system of an internal combustion engine for conducting the exhaust gas of said engine, the engine having an overrun phase during the operation thereof, the exhaust-gas system including a catalytic converter and the exhaust gas containing components including oxygen, the arrangement comprising:

said exhaust-gas probe being mounted downstream of said catalytic converter and supplying an output signal;

said exhaust-gas probe having a Nernst characteristic and being sensitive to said oxygen;

first means for controlling the metering of fuel to said engine;

second means for detecting and evaluating the slope of said output signal after interruption of said metering of said fuel to said engine in said overrun phase of operation;

third means for displaying or storing a fault of said exhaust-gas probe; and, said third means being adapted to display or store a slope as a fault when said slope has reached a predetermined flatness.

* * * * *